(12) United States Patent
De Ligt

(10) Patent No.: US 10,382,395 B2
(45) Date of Patent: Aug. 13, 2019

(54) INDUSTRIAL PROCESS CONTROL USING IP COMMUNICATIONS WITH PUBLISHER SUBSCRIBER PATTERN

(71) Applicant: Honeywell International Inc., Morris Plains, NJ (US)

(72) Inventor: Ruud De Ligt, Zuid Holland (NL)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 228 days.

(21) Appl. No.: 15/218,844

(22) Filed: Jul. 25, 2016

(65) Prior Publication Data

US 2018/0026942 A1 Jan. 25, 2018

(51) Int. Cl.
| | | |
|---|---|---|
| H04L 29/12 | (2006.01) | |
| G05B 19/418 | (2006.01) | |
| H04L 29/08 | (2006.01) | |
| H04L 29/06 | (2006.01) | |

(52) U.S. Cl.
CPC ........ H04L 61/35 (2013.01); G05B 19/41855 (2013.01); H04L 67/10 (2013.01); H04L 67/12 (2013.01); H04L 67/42 (2013.01); G05B 2219/31151 (2013.01); G05B 2219/33149 (2013.01); H04L 61/6004 (2013.01); Y02P 90/18 (2015.11); Y02P 90/185 (2015.11); Y02P 90/28 (2015.11); Y02P 90/86 (2015.11)

(58) Field of Classification Search
CPC ............... G06F 17/2247; G06F 17/227; G06F 17/30893; G06F 3/14; G06F 9/5072; G06F 13/4282; G06F 13/36; G05B 13/04; G05B 19/4185; G05B 15/02; G05B 19/042; H04L 12/413; H04L 12/6418; G01F 23/284; F22B 35/18
See application file for complete search history.

(56) References Cited

U.S. PATENT DOCUMENTS

| | | | |
|---|---|---|---|
| 6,680,690 B1 * | 1/2004 | Nilsson | G01F 23/284 342/118 |
| 7,565,351 B1 | 7/2009 | Callaghan | |
| 2006/0133412 A1 | 6/2006 | Callaghan | |
| 2011/0239109 A1 * | 9/2011 | Nixon | G06F 17/2247 715/236 |
| 2015/0127876 A1 * | 5/2015 | Erni | G05B 19/4185 710/315 |
| 2015/0276208 A1 * | 10/2015 | Maturana | F22B 35/18 700/274 |

* cited by examiner

*Primary Examiner* — Kyung H Shin
(74) *Attorney, Agent, or Firm* — Neil R. Jetter; Jetter & Associates, P.A.

(57) ABSTRACT

A method of controlling an industrial process run in a plant includes sending field data from the process to a data acquisition module. The data acquisition module converts the field data into Internet protocol (IP) field data. The IP field data is provided to an IP broker having a memory that stores the IP field data arranged in a tree of topics. The IP broker has a stored publisher/subscriber pattern including a plurality of clients including a first client subscribed by a published message to the IP broker that includes at least a selected topic from the tree of topics. Upon receipt of an update of the IP field data including the selected topic, the IP broker publishes the updated IP field data according to the publisher/subscriber pattern over a permanently open IP connection that is received by at least the first client.

20 Claims, 3 Drawing Sheets

INDUSTRIAL PROCESS CONTROL USING IP COMMUNICATIONS WITH PUBLISHER SUBSCRIBER PATTERN

FIELD

Disclosed embodiments relate to process data transmission for visualization and for controlling an industrial process.

BACKGROUND

Process control systems for industrial processes, whether distributed control system (DCS) or supervisory control and data acquisition (SCADA) systems, generally include one or more process controllers communicatively coupled to at least one host (e.g., an operator workstation) and to one or more process control devices (e.g., field devices) configured to communicate via analog, digital or combined analog/digital communication signals and/or protocols. Such process control systems are commonly used in chemical, pharmaceutical, pulp and paper manufacturing and petroleum processes. The field devices can comprise device controllers, valves, valve actuators or positioners, switches, transmitters (e.g., temperature, pressure, flow rate, or chemical composition sensors), performing functions within the process control system such as opening and/or closing valves and measuring process parameters. The process controller receives signals indicative of process measurements made by the field devices and/or other information pertaining to the field devices, uses this information to implement a control routine, and generates control signals over buses and/or other communication lines to the field devices to control the operation of the process control system.

Some industrial processes such as petroleum refining include storage tanks. Tank gauging is needed for the assessment of tank contents, tank inventory control and tank farm management. Radar and servo tank sensors (or gauges) help in accurate level gauging for refineries, tank terminals and petrochemical industries. Tank inventory systems utilize tank gauging data and provide connectivity for various field protocols that enable integration of existing field equipment. A set of standardized host interface areas are available to link software packages to control systems and business domain packages for advanced resource planning and asset management.

There are known tank inventory systems sufficiently flexible to handle tank farms ranging from a single tank up to more than 250 tanks, covering multiple locations and a variety of different gauges and interfaces. One such conventional tank inventory system comprises a pair of embedded software "host" applications running in a Communication Interface Unit (CIU) that is essentially basically an embedded personal computer (PC) and a dedicated WINDOWS graphical user interface (GUI) application that provides GUIs in standard formats for representing process data with both text and graphics running at a PC at an operator station or distributed control system (DCS).

This conventional tank inventory system requires high development costs and significant maintainability efforts because designing and implementing a GUI to suit all customers takes considerable effort. An experienced programmer is needed to perform this task. All logic for performing calculations, rounding, input validation, (button) event handling, localization, etc. also needs good programming skills. Moreover, such conventional tank inventory systems generally provide only a limited provision for customization/extension for customers should they have any specific need(s).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize known process control systems (e.g., tank inventory systems) depend on serial Modbus remote terminal unit (RTU) communications throughout. The data from the field devices generally gets polled in sequential order. This serial communications with sequential data ordering results in a somewhat sluggish deliver of field data to the operators in the control room. Moreover, serial lines are limited to maximum lengths and the data is limited to what is published in the Modbus map.

By using publish subscribe features of a modern Internet Protocol (IP) connectivity protocol (such as machine-to-machine (M2M) based on Internet of Things (IIoT technologies) because of the broader bandwidth of IP connections as compared to serial RTU lines the field data gets delivered to the operator or other client significantly faster. Other advantages include the IP communications simplifying configuration changes as they are published by the applications back to the IP broker, as well as other updates of data and/or commands including kill, manual overwrite and resurrects.

Disclosed control systems are better in providing site device management (SDM) data to service clients located somewhere in the local area network (LAN), wide area network (WAN) or in the cloud. Using conventional serial lines the service tools can only operate on the machine which is connected by the serial lines. With using IP connections such as based on IIoT technologies used in disclosed embodiments, service tools or diagnostic services can subscribe to data from anywhere in the LAN, WAN or cloud and analyze the state of the processing equipment and other devices while in process. Raw field data can be transported to the service tools easily. Diagnostics will also receive a new dimension such as analyzing the data, predicting maintenance and informing service engineers about it.

Disclosed embodiments include process data transmission, calculation and optional visualization architectures and associated methods for controlling industrial processes that utilize IP communications based on a publisher subscriber pattern of a publisher/subscriber model to deliver (push) process data to clients such as operators at operator stations. Stored messages are organized at an IP broker around a tree of topics, and clients subscribe to messages stored at the IP broker that are delivered to client(s) that subscribe to a particular topic or to groups of topics. The data pushed to the clients is generally used by the client to fill GUI components in their display for representing process data with both text and graphics generally running at a personal computer (PC) at an operator station or a distributed control system (DCS), or by web applications visualized by Internet browsers on a PC or any mobile device or mobile apps running on smart phones or tablets.

As known in communications, the IP suite is the computer networking model and set of communications protocols used on the Internet and similar computer networks commonly known as TCP/IP based on its most important protocols, the Transmission Control Protocol (TCP) and the Internet Protocol (IP) being the first networking protocols defined during its development. The IP communications can comprise, but is not limited to machine (M2M)/Internet of Things known as Message Queuing Telemetry Transport (MQTT), Advanced Messaging Queuing Protocol (AMQP), and OPC Unified Architecture (OPC UA). The process data from the device layer is converted from a serial protocol (e.g., Modbus) to IP communications which pushes the data directly to the application (GUI) layer by using a publish subscriber pattern. For example, in collaboration with a MQTT broker, live data from field devices in a plant can be pushed the application layer instead of the application layer pulling the data on request or at selected time intervals.

The application layer can apply a visualization algorithm to the calculated data configured to fill GUI's generally modeled in WINDOWS forms (WINDOWS GUIs). Instead, the calculated data can be processed by client' web applications for visualizing the content by Internet browsers on a PC or any mobile device or mobile application running on smart phones or tablets. A control activity regarding the processing equipment can be performed for controlling the equipment in the plant running the industrial process using the visualization provided by the WINDOWS GUIs or client' web applications.

DETAILED DESCRIPTION

Figure 1:
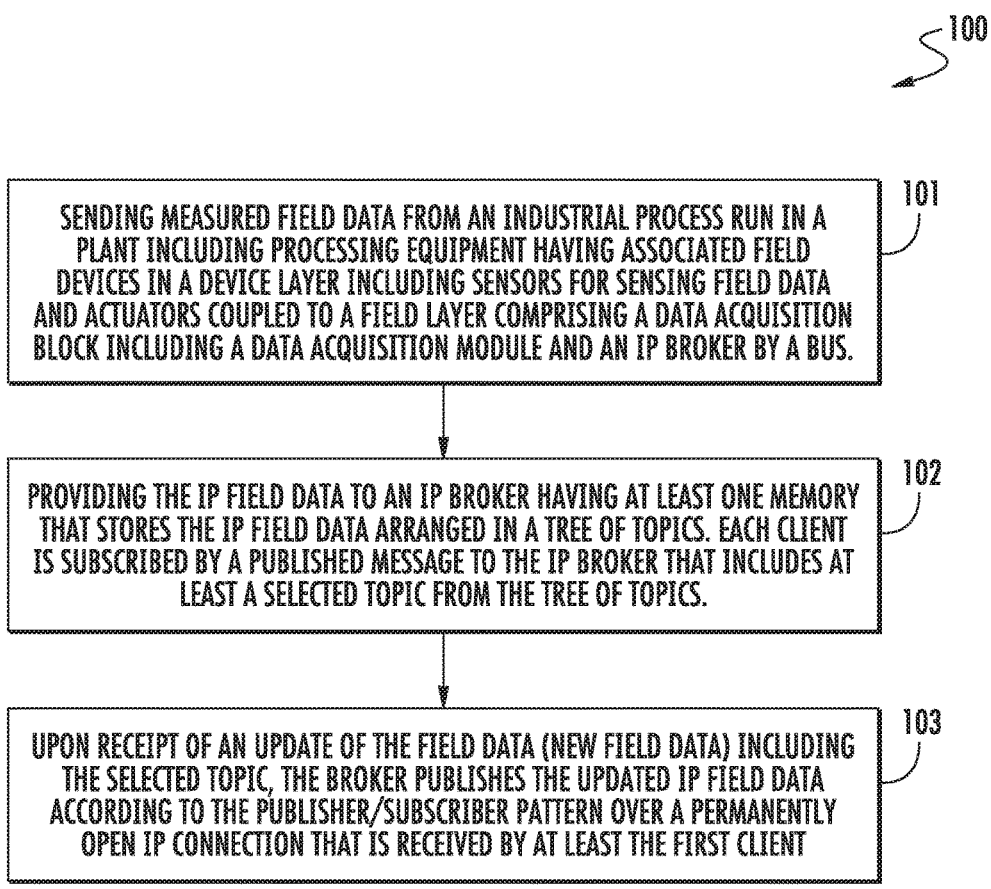
FIG. 1 is a flow chart that shows steps in a method of controlling an industrial process using IP communications based on a publisher subscriber pattern, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in a method 100 of controlling an industrial process using IP communications based on a publisher subscriber pattern, according to an example embodiment. Step 101 comprises sending measured field data from an industrial process run in a plant (see industrial plant 105 in FIGS. 2 and 3 described below) including processing equipment having associated field devices 110 in a device layer including sensors 110a, 110b, and actuator(s) 110c (collectively field devices 110) for sensing field data and processing equipment 112a, 112b coupled to a field layer 130 comprising a data acquisition block 135 including a data acquisition module 135a and an IP broker 135b by a bus 125.

The data acquisition module 135a can comprise a device for scanning or polling the field data, with this module generally called a scanner. The scanner makes sure the field data gets acquired regularly. A side task of the scanner is to raise events when the field devices 110 are not responding for some reason. However, the field data can flow to the data acquisition module 135a in other ways. In another embodiment, instead of scanning the measured field data to scanned data, the field devices 110 can be "smart" field devices programmed to deliver the field data regularly (at regular or predetermined intervals) to the data acquisition module 135a. The data acquisition module 135a converts the measured field data into IP field data.

IP communications provides end-to-end data communication specifying how data is packetized, addressed, transmitted, routed and received. As known in the art, this functionality is organized into four abstraction layers which are used to sort all related protocols according to the scope of networking involved. From lowest to highest, the layers are the link layer, containing communication methods for data that remains within a single network segment (link); the internet layer, connecting independent networks, thus providing internetworking; the transport layer handling host-to-host communication; and the application layer, which provides process-to-process data exchange for applications.

The IP data output by data acquisition module 135a can comprise MQTT data, AQMP data or OPC UA data. MQTT is an ISO standard (ISO/IEC PRF 20922) publish-subscribe-based "lightweight" messaging protocol for use on top of the TCP/IP protocol. AQMP stands for Advanced Message Queuing Protocol which is a wire-level protocol that is a description of the format of the data that is sent across the network as a stream of octets. OPC UA is an industrial machine-to-machine (M2M) communication protocol for interoperability developed by the Open Process Control (OPC) Foundation.

MQTT is low overhead, with only a 2-byte header for many messages. The MQTT design suits devices that are suspended (inactive) most of the time, with only occasional network activity. MQTT also has support for reliable delivery built into the protocol, so that simple sensors can simply flag an outgoing message as requiring confirmed delivery and let the IP broker take care of delivery reattempts. Using a standard messaging protocol for all communication also significantly reduces the surface area for possible security vulnerabilities.

Step 102 comprises providing the IP field data to an IP broker (see IP broker 135b in FIG. 2) having at least one memory 135$b_1$ (e.g., Random Access Memory) that stores the IP field data arranged in a tree of topics. A topic is generally a simple string that can have more hierarchy levels, which may be separated by a slash. Clients can subscribe to an exact topic or use a wildcard. The IP broker has a stored publisher/subscriber pattern in memory 135$b_1$ comprising a plurality of clients including at least a first client, such as a client at an operator station or DCS (see DCS 180 and operator station 185 in FIG. 2) and/or in an application layer (see application layer 150 in FIG. 2). Each client is subscribed by a published message to the IP broker that includes at least a selected topic from the tree of topics. Publish/subscribe is event-driven and enables messages to be pushed to clients.

The IP broker is the central communication point in charge of dispatching all messages between the senders (field devices 110) and the rightful receivers (clients). Each client that publishes a message to the broker includes a topic into the message. The topic includes the routing information for the IP broker to use. Each client that wants to receive messages subscribes to a certain topic and the IP broker delivers all messages with the matching topic to the client. Therefore the respective clients don't have to "know" each other, as they only communicate over the topic. This architecture enables highly scalable solutions without dependencies between the data producers and the data consumers.

In step 103 upon receipt of an update of the field data (new field data) including the selected topic, the IP broker publishes the updated IP field data according to the publisher/subscriber pattern stored in memory 135$b_1$ over a permanently open IP connection to at least the first client. For example, there is an IP connection 138 shown in FIG. 2 between the IP broker 135b and clients such as in the application layer 150 and the cloud computing system 190.

Figure 2:
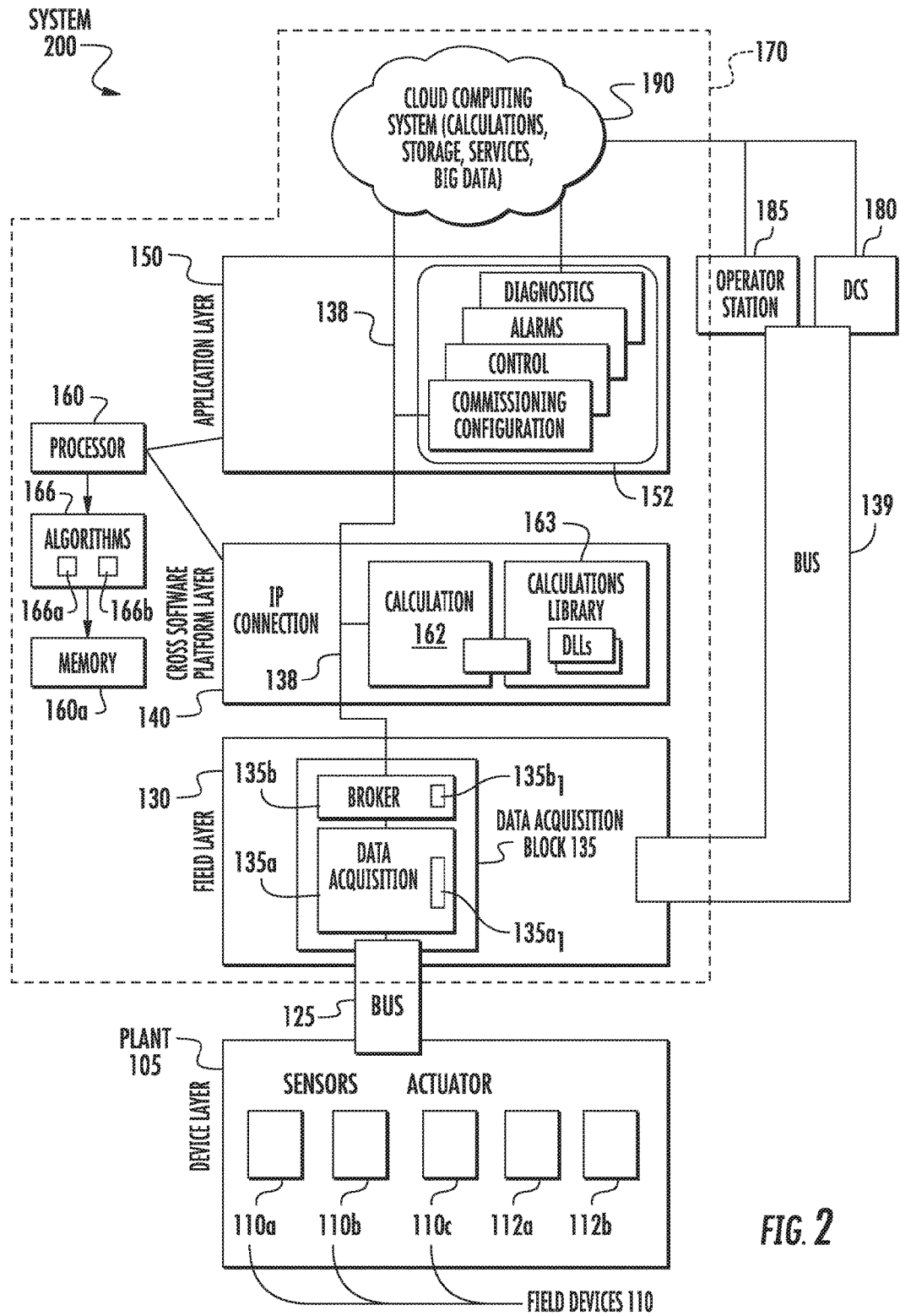
FIG. 2 is a depiction of an automatic control system that utilizes IP communications based on a publisher subscriber pattern associated with an industrial plant configured to run an industrial process, having an IP broker in a data acquisition block of the field layer, according to an example embodiment.

FIG. 2 is a depiction of an automatic control system 200 associated with an industrial plant 105 configured to run an industrial process (e.g., refining) that utilizes IP communications over an IP connection 138 based on a publisher subscriber pattern having an IP broker 135b in a data acquisition block 135, according to an example embodiment. The field layer 130 includes a data acquisition block 135 which functions as an input/output (IO) module that includes a data acquisition module 135a, where the data acquisition module 135a can comprise a smart Communication Interface Unit (CIU) which can provide an intelligent IO interface that knows about the processing equipment (e.g., instruments, tanks) and the complete site setup at the industrial plant 105. Such a CIU can take care of fetching the field data from the field devices 110, performing data calculations, and presenting a complete record as shown in FIG. 2 to layers such as the cross software platform layer 140, application layer 150, and cloud computing system 190. The field layer 130, cross software platform layer 140, application layer 150 and cloud computing system 190 collectively can be considered a data processing and visualization system 170 for the control system 200.

The field devices 110 in industrial plant 105 shown as sensors 110a, 110b provide measured field data and actuators 110c are coupled to processing equipment 112a, 112b (such as storage tanks in a refining or distillation system) configured together to run an industrial process. The field devices 110 are coupled by a bus 125 to the field layer 130.

The bus 125 can be a serial bus, such as a MODBUS RTU, used in serial communication which makes use of a compact, binary representation of the data for protocol communication.

In the arrangement shown in FIG. 2, process data from the plant 105 acquired by data acquisition block 135 is stored in a cache memory 135$a_1$ in the data acquisition module 135a. Typically the hosts are connected peer-to-peer to the data acquisition module 135a, with the host in FIG. 2 being the IP broker 135b which hosts the calculated data provided by the data acquisition module 135a. The IP broker 135b scans this cache memory 135$a_1$ on regular basis to collect new field data. This means two asynchronous communication routines working with the same cache memory 135$a_1$, meaning the data acquisition module 135a such as a scanner is polling the field data from the field devices 110 and is storing it in the cache memory 135$a_1$ while the IP broker 135b is polling the same cache memory 135$a_1$ for updates. As the data acquisition module 135a and IP broker 135b both rely on the same cache memory 135$a_1$, some latency can be expected.

In a tank gauging system one typically finds scanned values, commissioning, configuration, diagnostics and calculated values in this system 200 are arranged as topics in a memory 135$b_1$ of the IP broker 135b. By creating a well-defined object, an instance can be used for the payload of the topics. To avoid latency an intelligent controller (e.g., an intelligent CIU) for the data acquisition module 135a can process the acquired field data and use it to prepare a verbose payload containing all the parameters the applications need. This object can be a JavaScript Object Notation (JSON), binary JSON (BSON) or generally any serialized object type modeling the payload.

The object of the payload can hold the process parameter value, the status, the validity, timestamp, units of measurement, and boundaries such as minimum and maximum allowed values, the required update rate, the category, etc. The data acquisition module 135a populates the value fields of the prepared serialized object modeling the payload and publishes it to the IP broker 135b. All clients in the application layer 150, the calculation block 162/DLLs 163, and cloud computing system 190 subscribed to the IP broker 135b connected by the IP connection 138 will automatically receive call-backs and further process the data without latency, and optionally the DCS 180 its and operator station 185 can also be clients of the IP broker 135b when the bus 139 is an TCP/IP bus. The calculation block 162/DLLs 163 can generally be any solution such as a service, WINDOWS or other OS Application, or Web service.

All topics with their payload will be stored in the memory 135$b_1$ of the IP broker 135b, such as scanned values, commissioning, configuration, diagnostics and calculated values such as when the data acquisition module 135a comprises a 'smart' CIU. Configuration changes will be published from the application layer 150 (optionally the DCS 180 its and operator station 185, and cloud computing system 190 in the IP broker 135b (or broker(s)). This simplifies the configuration of the data acquisition block 135. By subscribing to changes the data acquisition block 135 can update its scan list by received call-backs published by the commissioning/configuration module 152 shown in FIG. 3.

The data acquisition module 135a such as a CIU can be Ethernet enabled. The data acquisition block 135 is shown coupled by a bus 139 to the DCS 180 and its operator station 185 that are both shown outside of the application layer 150 as they can process raw field data received from the field layer 130. DCS 180 can also have an IP input to acquire data from the IP broker 135*b*, or a Modbus input to acquire data directly from the input of the data acquisition block 135 (e.g., CIU or similar device) by a serial or an Ethernet link.

The data processing and visualization system 170 also includes a cross software platform layer 140. The cross software platform layer 140 and application layer 150 are generally implemented by one or more processors shown as processor 160 that is generally part of computing device such as a personal computer (PC)/server. The processor 160 can comprise a microprocessor, digital signal processor (DSP), or microcontroller unit (MCU). The cross software platform layer 140 is coupled by the IP connection 138 to receive data from the IP broker 135*b*. The processor 160 has an associated memory 160*a* that stores algorithms shown collectively as 166 including a calculation algorithm 66*a* for implementing the calculation block 162 that performs calculations on the field data and an optional visualization algorithm 166*b*. The visualization algorithm 166*b* populates with calculated data from the calculation algorithm 166*a* for filling WINDOWS GUIs, or the calculated data is visualized without the need for the visualization algorithm 166*b* by web applications visualized by Internet browsers on a PC or any mobile device or mobile applications running on smart phones or tablets for a display.

The visualization algorithm 166*b* allows a user (e.g. at the application layer 150 or at the operator station 185) to select a mapping that maps some or all the data available from the cross software platform layer 140 to fill WINDOWS GUIs. For example, the data acquisition provided by the cross software platform layer 140 generally has a plurality of different data entities available, such as for tank applications Tank1/Level, Tank1/Temperature, Tank1/Volume. The user can change the mapping table at any time when he or she wants to move the data to other WINDOWS GUIs or other web applications The application layer 150 can host any application which is able to subscribe to the IP broker 135*b* and visualize the payload of the topics. The application layer 150 can generally comprise any application capable of de-serializing and visualizing the payload. Between the cross software platform layer 140 and applications layer 150 is a publish subscribe relationship. All applications can subscribe on data which get pushed from the IP broker 135*b* to the applications. On the other hand placing the subscriptions but also the storage/update of configuration data will flow from applications back to the IP broker 135*b*. The IP broker 135*b*, application layer 150 and calculation block 162 are connected to one another by the IP connection 138.

The bus 139 for legacy systems enables DCS 180 and its operator station 185 to connect to the field layer 130 by Modbus, or by an OPC connection. The provided peer-to-peer connections can comprise RS232, or RS485 connections. For future DCS systems, bus 139 can comprise M2M protocols over TCP/IP or OPC-UA (over TCP/IP). The operator station 185 for DCs 180 may also be moved to the application layer 150 which has advantages including bandwidth, essentially no latency, longer distance, and remote capabilities. The cloud computing system 190 shown allows data to be stored in the cloud and for some host services to be remotely performed there.

The calculation library 163 is shown implemented as a plurality of separate modules (e.g., DLLs), which for tank applications can provide American Petroleum Institute (API)-conforming calculations. In the case of tank inventory applications, calculation library 163 can implement other calculation methods, such as ASTM or GPA. The data acquisition provided by the cross software platform layer 140 can include a plurality of data entities available that by a mapping table customizing a visualization algorithm 166*b* from a user can map respective data entities to selected WINDOWS GUIs. The user can change the mapping table at any time when he/she wants to move the data.

Figure 3:
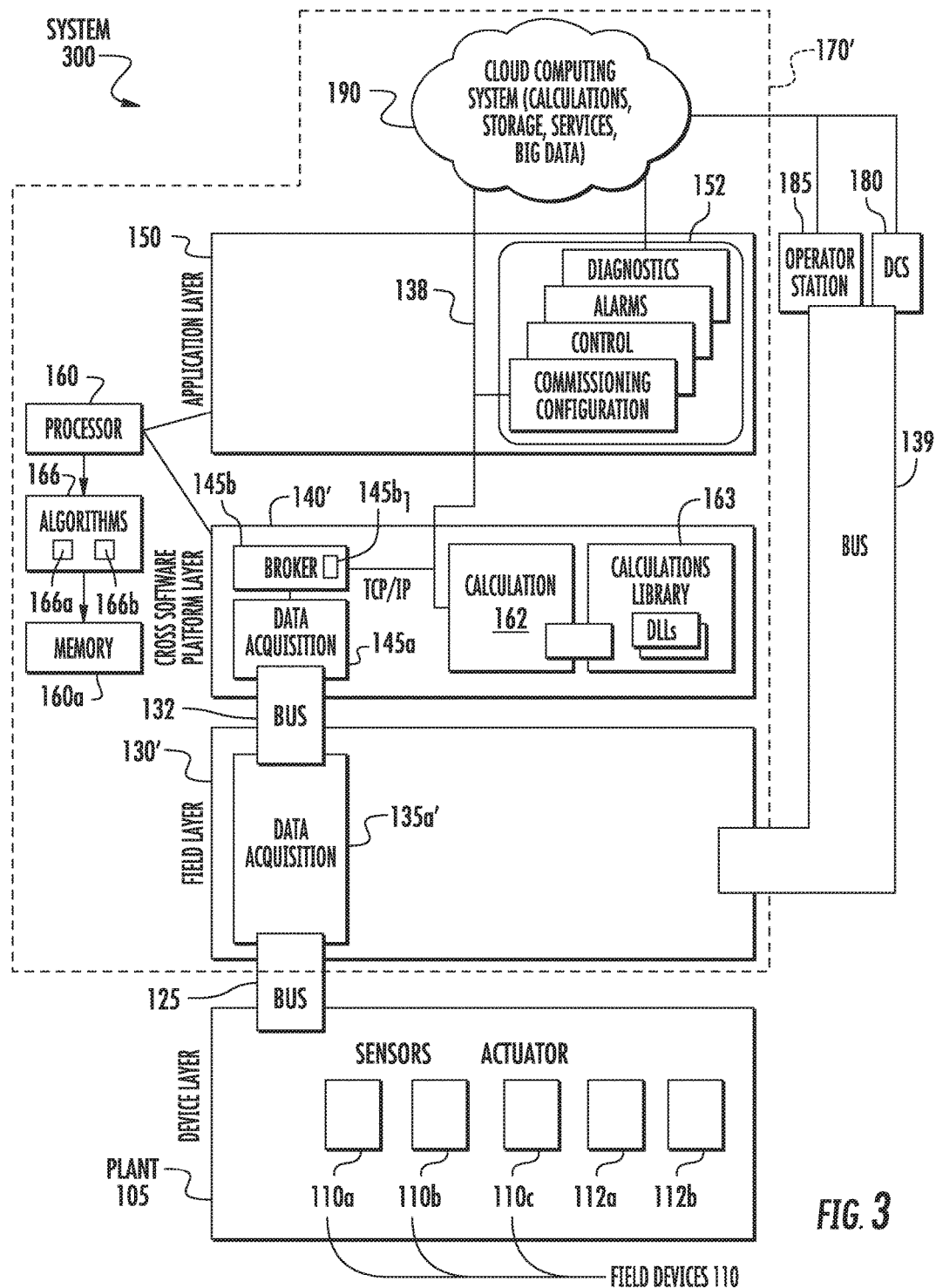
FIG. 3 is a depiction of an automatic control system that utilizes IP communications based on a publisher subscriber pattern associated with an industrial plant configured to run an industrial process, having an IP broker in the cross platform layer, according to an example embodiment.

FIG. 3 is a depiction of an automatic control system 300 that utilizes IP communications based on a publisher subscriber pattern associated with an industrial plant 105 configured to run an industrial process, having an IP broker 145*b* having memory 145$b_1$ in the cross software platform layer 140', according to an example embodiment. In this embodiment the data acquisition module 135*a*' in the field layer 130' is not an intelligent (smart) module and thus does not perform calculations on the field data it receives. The data acquisition module 135*a*' generates raw scanned field data fetched by the cross software platform layer 140' that includes a data acquisition module 145*a*. A bus 132 (e.g., Modbus) connects the data acquisition module 135*a*' to the data acquisition module 145*a*. In this embodiment the data acquisition module 145*a* converts the serial field data received from the data acquisition module 135*a*' into IP field data that is provided to the IP broker 145*b*. The field layer 130, cross software platform layer 140', application layer 150 and cloud computing system 190 collectively can be considered a data processing and visualization system 170' for the control system 200

In control system 300 the calculations are performed in the cross software platform layer 140' or by the application layer 150. Typically a GUI is used to display (visualize) the values fetched by the data acquisition module 135*a*' and display the information to the end user. In control system 300 the visualization algorithm 166*b* processes the data received from bus 132 and prepares it for showing to the user as described as GUI layer functions in the paragraph below.

Even when the field data comes as a prepared record with calculated data (such as by a 'smart' data acquisition module 135*a* in FIG. 2), it generally needs to be processed by a GUI application in the application layer to display (visualize) it. The Modbus output conventional CIUs as the data acquisition module 135*a* or 135*a*' provide include a number of bytes. The GUI application generally needs to perform a number of functions, for example extracting the information, taking care of the rounding and format in a number of decimals and showing the right units of dimension. On request values need to be converted to another dimension and shown with another number of decimals. Colors can be provided having special meanings, and the status generally needs to be determined and shown.

Although not shown, disclosed embodiments include automatic control systems including a data processing and visualization system using IP communications based on a publisher subscriber pattern associated with an industrial plant configured to run an industrial process, having an IP broker in the CIU and another IP broker in the cross platform layer. This arrangement enables use of a data acquisition module with either basic CIU(s) or smart CIU(s) to be accommodated.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A method of controlling an industrial process, comprising:
   sending measured field data from said industrial process run in a plant including processing equipment having associated field devices including sensors and actuators to a data acquisition module;
   said data acquisition module converting said measured field data into Internet protocol (IP) field data;
   providing said IP field data to an IP broker having at least one memory that stores said IP field data arranged in a tree of topics;
   wherein said IP broker has a stored publisher/subscriber pattern comprising a published message received from a plurality of clients including a first said published message including a first selected topic from said tree of topics and first client routing information from a first client and a second said published message including a second selected topic different from said first selected topic from said tree of topics and second client routing information from a second client;
   wherein upon receipt of an update of said IP field data including said first selected topic, said IP broker determines from said publisher/subscriber pattern that said first selected topic is a matching topic for said first client and in response publishes said updated IP field data according to said publisher/subscriber pattern over a permanently open IP connection to said first client but not to said second client.

2. The method of claim 1, wherein said data acquisition module and said IP broker are between a field layer and a process controller.

3. The method of claim 1, wherein said data acquisition module and said IP broker are in a cross platform layer.

4. The method of claim 1, further comprising an application layer including a commissioning and configuration module for publishing call-backs from said plurality of clients to said IP broker.

5. The method of claim 1, wherein said plurality of clients include at least one client in an application layer.

6. The method of claim 1, wherein said plurality of clients include at least one client in a cloud comprising a cloud computing system.

7. The method of claim 1, wherein said IP broker comprises a Message Queuing Telemetry Transport (MQTT) broker.

8. The method of claim 1, wherein said data acquisition module comprises a scanner.

9. The method of claim 1, further comprising applying a GUI application to prepare said updated IP field data for visualization by said first client, and said first client performing a control activity regarding said processing equipment for controlling said industrial process using said visualization of said updated IP field data.

10. The method of claim 1, wherein said processing equipment includes at least one storage tank, wherein said sensors include at least one tank level gauge, and wherein said updated IP field data includes tank inventory information.

11. A data processing and visualization system, comprising:
    a data acquisition module for converting received measured field data into Internet protocol (IP) field data, said measured field data from an industrial process run in a plant including processing equipment having associated field devices including sensors and actuators;
    said data acquisition module coupled to provide said IP field data to an IP broker having at least one memory that stores said IP field data arranged in a tree of topics;
    wherein said IP broker has a stored publisher/subscriber pattern comprising a published message received from a plurality of clients including a first said published message including a first selected topic from said tree of topics and first client routing information from a first client and a second said published message including a second selected topic different from said first selected topic from said tree of topics and second client routing information from a second client;
    wherein upon receipt of an update of said IP field data including said first selected topic, said IP broker determines from said publisher/subscriber pattern that said first selected topic is a matching topic for said first client and in response publishes said updated IP field data according to said publisher/subscriber pattern over a permanently open IP connection to said first client but not to said second client.

12. The data processing and visualization system of claim 11, wherein said data acquisition module and said IP broker are between a field layer and a process controller.

13. The data processing and visualization system of claim 11, wherein said data acquisition module and said IP broker are in a cross platform layer.

14. The data processing and visualization system of claim 11, further comprising and application layer including a commissioning and configuration module for publishing call-backs to said IP broker.

15. The data processing and visualization system of claim 11, wherein said IP broker comprises a Message Queuing Telemetry Transport (MQTT) broker.

16. The data processing and visualization system of claim 11, wherein said data acquisition module comprises a scanner.

17. The data processing and visualization system of claim 11, further comprising a GUI application for preparing said updated IP field data for visualization by said first client, wherein a control system utilizing said data processing and visualization system performs a control activity regarding said processing equipment for controlling said industrial process using said visualization of said updated IP field data.

18. The data processing and visualization system of claim 11, wherein said processing equipment includes at least one storage tank, wherein said sensors include at least one tank level gauge, and wherein said updated IP field data includes tank inventory information.

19. A computer program product, comprising:
    a non-transitory data storage medium that includes program instructions executable by a processor to enable said processor to execute a method of visualizing data from an industrial process run in a plant including processing equipment having associated field devices including sensors and actuators, said method comprising:

converting measured field data into Internet protocol (IP) field data, said measured field data from said field devices;

storing said IP field data arranged in a tree of topics associated with an IP broker along with a stored publisher/subscriber pattern comprising a published message received from a plurality of clients including a first said published message including a first selected topic from said tree of topics and first client routing information from a first client and a second said published message including a second selected topic different from said first selected topic from said tree of topics and second client routing information from a second client;

wherein upon receipt of an update of said IP field data including said first selected topic, said IP broker determines from said publisher/subscriber pattern that said first selected topic is a matching topic for said first client and in response publishes said updated IP field data according to said publisher/subscriber pattern over a permanently open IP connection to said first client but not to said second client.

20. The computer program product of claim 19, wherein said IP broker comprises a Message Queuing Telemetry Transport (MQTT) broker.

\* \* \* \* \*